US006648963B2

(12) United States Patent
Pasquier et al.

(10) Patent No.: US 6,648,963 B2
(45) Date of Patent: Nov. 18, 2003

(54) COMPOSITION FOR DEACTIVATING THE SURFACE OF CONCRETE OR MORTAR AND ITS PROCESS OF APPLICATION

(75) Inventors: Michel Pasquier, Noisy le Roi (FR); Pierre Colombet, Longnes (FR); Pierre Cassat, Le Mesnil Simon (FR)

(73) Assignee: Ciments Francais, Puteaux (FR)

( * ) Notice: Subject to any disclaimer, the term of this patent is extended or adjusted under 35 U.S.C. 154(b) by 0 days.

(21) Appl. No.: 10/207,824

(22) Filed: Jul. 31, 2002

(65) Prior Publication Data

US 2003/0110988 A1 Jun. 19, 2003

(30) Foreign Application Priority Data

Aug. 1, 2001 (FR) .............................. 01 10310

(51) Int. Cl.$^7$ .............................. C04B 24/04
(52) U.S. Cl. .................. 106/728; 106/724; 106/819; 106/823; 524/3; 524/5
(58) Field of Search .................. 106/724, 728, 106/819, 823; 524/3, 5

(56) References Cited

U.S. PATENT DOCUMENTS 4,004,066 A * 1/1977 DeArdo ....................... 428/538

FOREIGN PATENT DOCUMENTS

DE 230 861 A1 12/1985
FR 2 722 777 1/1996

OTHER PUBLICATIONS

XP–002193697, Jeffrey Tamburrino, "High–Performance, Cost–Effective Rheology Modifiers for the Coatings Industry", Oct. 23, 2000.

* cited by examiner

Primary Examiner—Paul Marcantoni
(74) Attorney, Agent, or Firm—Young & Thompson

(57) ABSTRACT

The surface deactivating composition for concrete or mortar comprising a retardant, water and if desired a rheology modifying agent of the HASE type (emulsion, soluble in alkali, of a polymer with hydrophobic modification), characterized in that the retardant is a carboxylic acid and in that the concentration of HASE is greater than or equal to 0.5% by weight. The process of application consists in applying this deactivating composition in proportions of the order of 0.25+0.05 liter per square meter of the surface, then washing with water this surface after a predetermined period.

10 Claims, 2 Drawing Sheets

COMPOSITION FOR DEACTIVATING THE SURFACE OF CONCRETE OR MORTAR AND ITS PROCESS OF APPLICATION

FIELD OF THE INVENTION

The present invention relates to a composition for deactivating the surface of concrete or mortar, a process of obtaining a concrete or mortar deactivated with the help of this composition and their uses.

BACKGROUND OF THE INVENTION

Deactivated concrete or mortar is a material in which the superficial cement has been eliminated, leaving granulates to appear in relief thereby permitting obtaining a certain aesthetic effect.

Thus, for usual concretes, the surface appearance is determined by the quality of the mold (vertical surfaces or mold foot) or by the quality of finish of the surfaces obtained by floating (horizontal surfaces). The appearance which results is that of a smooth or almost smooth concrete whose color is essentially determined by that of the cement and the fines. For certain applications such as road maintenance and facade elements, it is interesting to provide concretes which, whilst maintaining their structural performance, have a widened variety of appearances.

In the industry of prefabrication of ready to use concrete, the methods that are most useful to cause the granulates to appear consist either in treating the surface of the concrete (after hardening and possible demolding) by using mechanical means, or by deactivating the surface of the concrete during the period of hardening by using chemical retardants.

Concretes adapted to be deactivated must preferably have a granulometric distribution of the particulate granulates to the end of ensuring regularity of their appearance when these latter are visible at the surface.

Once these precautions are taken, deactivation consists in distributing over the exposed surface of the fresh concrete or on the surface of the mold adapted to receive the fresh concrete, a compound having retardant effect on the setting of the cement. The compound must be in a concentration such that its retardant effect is within the top millimeters of depth. Thus, only the mortar near the surface of the concrete (namely the concrete skin) will have a different setup time. The body of the concrete itself will set normally. When the body of the concrete is sufficiently hardened, cleaning its surface with water (possibly under pressure)—or "soaking"—is carried out. Not having set up, the mortar is eliminated, and the granulates appear whilst remaining secured to the assembly.

It is thus necessary to formulate balanced deactivating compositions, which is to say such that the active principle (the retardant) penetrates the mortar at most a distance equal to one-third of the largest diameter of the granulates—if not they loosen—and however give rise, over this distance, to a retardation of setting sufficiently long to let the body of concrete harden and thereby permit the cleaning of the surface of the concrete without damaging the body.

The compositions already on the market comprise a setting retardant, most often associated with a so-called "curing" product which is generally a resin made solvent in an aliphatic solvent, forming a film which limits the drying of the concrete before "soaking".

These compositions thus have the drawback of including volatile solvents which are undesirable according to recent directives on admissions of volatile organic compounds (VOC) in the environment.

Among the retardants, can be cited the gluconates, or else cyclic aminoplast resins described in the patent FR2 722 777.

More recently there have been used aqueous compositions of latex base of the type of styrene butadiene, playing the role of a curing agent, including a cyclic aminoplast resin as retardant and if desired applying the rheology, namely a thickener: cellulose ether or compound of the HASE type (emulsion, soluble in alkali, of a polymer with hydrophobic modification) to avoid running on inclined ground.

This thickener is of low concentration (less than 0.5% by weight) so that the composition will be sufficiently fluid to be sprayed.

Such compositions (see Table 1) sold in commerce, are arranged according to ranges of power (which is to say concentration of retardant) suitable for the usual sizes of granulates and to climatic conditions at the workplace because the temperature affects the setting of the cement and the speed of diffusion of the active principle.

TABLE I

Deactivating formula according to the prior art (the proportions are expressed in weight percentages of dry extract). The range of power is a function of the proportion of retardant agent.

| | |
|---|---|
| Styrene-butadiene type latex | 7.5 |
| Retardant | 1 to 20 |
| Cyclic aminoplast resin | |
| (HASE thickener) | (0.45) |
| Antifoaming agent | 0.1 |
| Water | q.s. 100 |

However there will always remain a certain number of imponderables as to the climate, particularly during the time before washing, which is to say once the selected power is applied. As a consequence, the provided power is often not the best. If the temperature of the workplace or of the shop is higher than provided, setting is too rapid and it becomes impossible to wash the skin of the concrete, which is too hard. If the temperature is lower than provided, setting is too slow and the body of the concrete does not harden sufficiently rapidly to permit washing the surface in a reasonable time without it being damaged.

SUMMARY OF THE INVENTION

A first object of the invention is therefore to overcome the drawbacks connected to climatic imponderables, by providing a deactivating composition which permits selecting the power of deactivation independently of the external temperature during production of the concrete and independently of the duration of action of said composition before washing ("soaking").

The deactivating composition according to the invention should be adapted to be applied by a conventional method such as spraying. The composition should moreover have a high viscosity to avoid possible running or accumulation in the low points, whilst promoting regular and homogeneous distribution over the surface of the concrete to be treated. However, spraying the compositions including rheology modifying agents (thickeners) is not easy.

A second object of the invention is thus to provide a homogeneous composition having rheological characteristics permitting on the one hand its spraying and on the other hand its application without running or accumulation.

These objects are achieved by the composition according to the invention, namely a deactivating composition for the surface of concrete or mortar comprising a retardant, water and if desired a Hydrophobically Modified Alkaline Soluble Emulsion polymer, abbreviated as HASE as a rheology modifying agent, characterized in that the retardant is a carboxylic acid and in that the concentration of HASE is greater than or equal to 0.5% by weight. Preferably, the concentration of HASE is comprised between 1 and 10% by weight, preferably between 5 and 6% by weight.

The combination of an HASE, in particular at such a concentration level, with a carboxylic acid in acidic form, and not in its salt form, permits surprisingly to obtain a deactivating composition with low viscosity, easy to spray, whose rheology does not change (by thickening) until contact with the surface of the concrete (exceeding a viscosity of 5,000 to 10,000 mPa's, for example). There are accordingly no problems of running nor accumulation in low points. The deactivating composition according to the invention can even be used on vertical walls.

Thus, mixtures of sodium glucanate or cyclic aminoplast resins with several percent of HASE are too viscous to be sprayed.

The rheology modifier of the HASE type can be constituted either by homopolymers obtained from acrylic acid, methacrylic acid or acrylamide, or copolymers obtained from the same monomers with, in addition, acrylic esters in various proportions.

Preferably, the carboxylic acid has the general formula (I):
Formula (I):
$R_1$ being H or —$CH_2$—COOH
$R_2$ being H or OH
$R_3$ being H, $CH_3$, —(CHOH)n-$CH_2$OH, or —(CHOH)n-COOH
and n being a whole number from 1 to 3.

The retarder can particularly be selected from acidic acid, tartaric acid, citric acid, gluconic acid or lactic acid.

It has been discovered that in a preferred manner, the carboxylic acid is an an alcohol acid, which is to say that the carbon carrying the carboxylic acid function also carries a hydroxy group (case in which $R_2$=OH in the formula (I) above).

The surprising character of the invention resides in the fact that when a combination is used of a carboxylic acid (most of the time generally known as a retarder) and a rheology modifying agent of the HASE type, in particular at a concentration greater than or equal to 0.5%, in a formula for deactivating the surface, the delay in setting of the skin of the concrete is practically invariable with temperature (particularly between about 5 and 40° C.) and independent of the duration of washing of the concrete after spraying the deactivator. This gives to the composition according to the invention a very wide facility and flexibility of use, particularly at outside workplaces, and particularly in summer.

The composition according to the invention being an aqueous solution, it moreover has the advantage of not containing petroleum origin solvents. It cannot be implied in emission of VOC's (volatile organic compounds) in the atmosphere according to the directive 1999/12/CE of the Council relative to the reduction of emissions of volatile organic compounds due to the use of organic solvents in certain activities and installations.

The present invention also relates to the process for the modification of the surface of concrete or mortar during its setting, consisting in applying a deactivating composition according to the invention in proportions of the order of 0.25±0.05 liter per square meter of said surface, then washing with water this surface after a predetermined period.

The composition according to the invention can be used for the deactivation of concrete or mortar made with any type of cement, in particular cements of the type CEM I or CEM II.

This use is altogether appropriate at temperatures comprised between about 5 and 40° C.

BRIEF DESCRIPTION OF THE DRAWINGS

The present invention will be better explained with the help of the following illustrative examples, and the accompanying drawings, in which.

DETAILED DESCRIPTION OF THE INVENTION

EXAMPLES

Various concrete slabs having the following formulation (in $kg/m^3$) have been subjected to different deactivation tests:

| CEMent CPJ CEM II A 42.5 | 330 |
|---|---|
| Sand 0/4 mm | 394 |
| Gravel 4/8 mm | 94 |
| Gravel 8/16 mm | 1,299 |
| Total water | 162 |

The constituents are introduced into a 90 liter mixer. After a step of pre-homogenization, the water is introduced. Mixing is continued 2 minutes more and then the concrete is poured into molds 30 CEM×30 CEM×5 CEM.

Once the concrete is vibrated, with the help of a vibrating probe, it is smoothed with a float so as to obtain a perfectly smooth surface. The deactivator is applied with the help of a pressed air spray. The quantity applied is 0.22 liters per square meter. After a predetermined period, the slabs are cleaned with water under pressure (about 90 bars).

Measurement Method Used

So as to evaluate the effectiveness of retardation of setting of a concrete surface, a test of surface geometry of a road covering was used: the method of measuring the height to the sand. This is a measurement of macro-texture. The texture is measured according to the standard NF P98-216-1. It is a measure of mean height of the texture of a surface by filling the hollows with the help of a given volume of a specified sand.

Example 1

The deactivating composition according to the invention comprises (proportions expressed as percentages by weight of dry extract):

| | |
|---|---|
| Latex | 9.4 |
| Retardant (carboxylic acid) | 1 to 20 |
| Rheology modifying agent (HASE) | 6 |
| Anti-foaming agent (polydimethylsiloxane) | 0.05 |
| Water | q.s. 100 |

The latex used here is an aqueous dispersion of carboxylated anionic butadiene styrene copolymer.

The latex serves as a product for curing the fresh concrete (useful to avoid too great drying of the concrete during high heating) and also permits opacifying the aqueous composition so as better to color it (the operator thus verifying where he has applied the solution).

In this example, variable weight proportions of citric acid have been tested (1, 5, 10 and 15%) at different temperatures.

Figure 1:
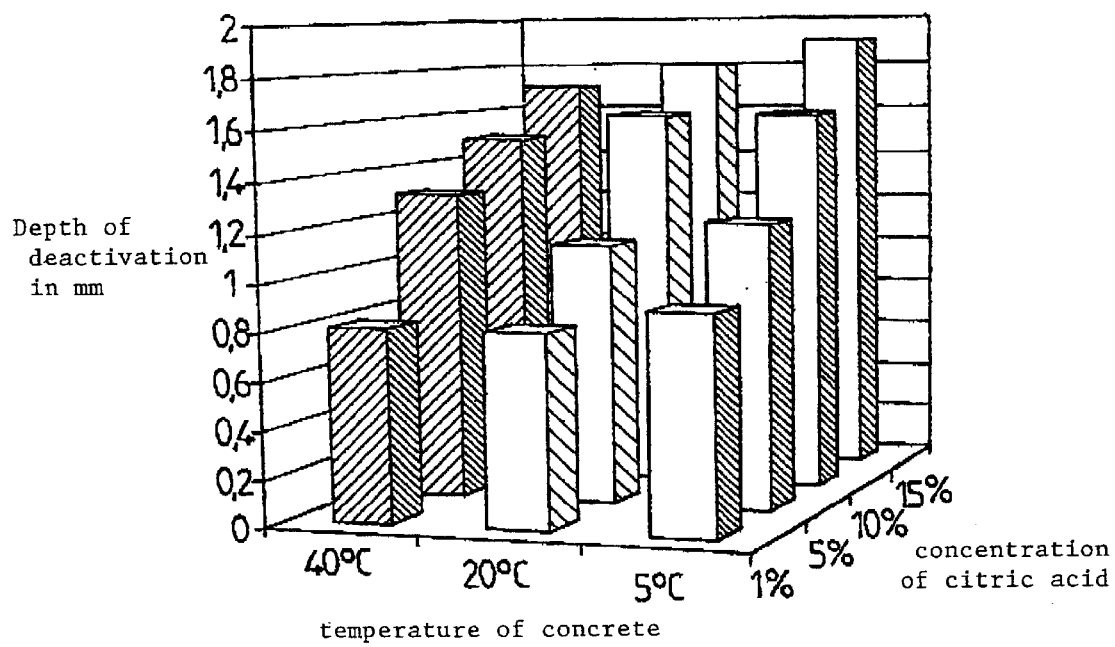
FIG. 1 shows the depth of deactivation of a composition according to the invention containing citric acid as retardant, as a function of the concentration of citric acid at different temperatures of the concrete.

The depth of deactivation as a function of the concentration of citric acid and of the temperature of the concrete for a washing time of 20 hours, are given in Table II, and displayed in FIG. 1.

TABLE II (the depths of deactivation are expressed in millimeters)

| | Temperature | | |
|---|---|---|---|
| Citric acid | 5° C. | 20° C. | 40° C. |
| 1% | 0.9 | 0.8 | 0.8 |
| 5% | 1.2 | 1.1 | 1.3 |
| 10% | 1.6 | 1.6 | 1.5 |
| 15% | 1.9 | 1.8 | 1.7 |

It will be noted that the depth of deactivation is proportional to the quantity of carboxylic acid (retardant) added, but practically independent of temperature.

Example 2

This example relates to the comparison between a composition according to the invention, including 6% of HASE, and a citric acid concentration equal to 5% by weight, and a composition according to the prior art including 5% of retardant of the cyclic aminoplast resin type and less than 0.5% by weight of HASE. Different temperatures of the concrete (5 to 35° C.) have been tested as well as different times of washing (16 to 24 hours). The results are given in the following Table III.

TABLE III (depth of deactivation in mm)

| Retardant 5% | Prior Art [HASE] < 0.5% | | | Invention [HASE] = 6% | | |
|---|---|---|---|---|---|---|
| Time | 16 H | 20 H | 24 H | 16 H | 20 H | 24 H |
| Temperature | | | | | | |
| 5° C. | 4.71 | 4.35 | 3.96 | 1.40 | 1.33 | 1.26 |
| 20° C. | 2.46 | 2.06 | 1.68 | 1.26 | 1.19 | 1.12 |
| 35° C. | 0.20 | 0 | 0 | 1.11 | 1.05 | 0.98 |

TABLE III-continued (depth of deactivation in mm)

| Retardant 5% | Prior Art [HASE] < 0.5% | | | Invention [HASE] = 6% | | |
|---|---|---|---|---|---|---|
| Time | 16 H | 20 H | 24 H | 16 H | 20 H | 24 H |
| Variation (5°–35°) | 4.5 | 4.35 | 3.96 | 0.29 | 0.28 | 0.28 |
| % of variation | 98 | 100 | 100 | 20 | 24 | 24 |

It will be seen that the incidence of a variation of temperature (from 5 to 35° C.) on the depth of deactivation is about 4 times less for the combination of the invention. The depth of deactivation does not vary between the times of washing at 16 and 24 hours in a significant way.

Example 3

In this example are compared compositions according to the prior art and according to the invention, identical to those of Example 2, but with 10% of retardant (respectively 10% of cyclic aminoplast resin and 10% of citric acid).

TABLE IV (depth of deactivation in mm)

| Retardant 10% | Prior Art [HASE] < 0.5% | | | Invention [HASE] = 6% | | |
|---|---|---|---|---|---|---|
| Time | 16 H | 20 H | 24 H | 16 H | 20 H | 24 H |
| Temperature | | | | | | |
| 5° C. | 4.98 | 4.61 | 4.22 | 1.70 | 1.62 | 1.57 |
| 20° C. | 2.73 | 2.33 | 1.95 | 1.55 | 1.48 | 1.41 |
| 35° C. | 0.47 | 0.08 | 0 | 1.41 | 1.34 | 1.28 |
| Variation (5°–35°) | 4.51 | 4.53 | 4.22 | 0.29 | 0.28 | 0.29 |
| % of variation | 90 | 98 | 100 | 17 | 17 | 18 |

It will be seen that the effect of a temperature variation (from 5 to 35° C.) on the depth of deactivation is about 5 times less for the combination of the invention. The variation of time (from 16 to 24 hours) has no effect on the depth of deactivation for the combination of the invention. This is not the case for the combination of the prior art.

Figure 2:
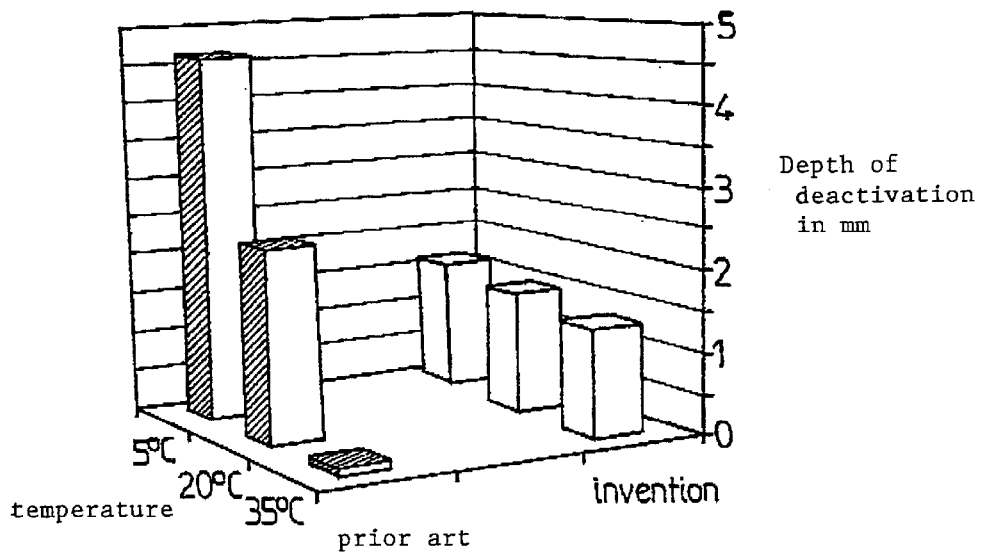
FIG. 2 gives a comparison between a composition according to the invention and a composition according to the prior art, at different temperatures for a washing time of 20 hours.

FIG. 2 illustrates comparative results obtained for two above compositions as a function of the temperature at a washing time of 20 hours.

Example 4

In this example are compared compositions according to the prior art and according to the invention identical to those of Examples 2 and 3, but with 18% of retardant (respectively 18% of cyclic aminoplast resin and 18% of citric acid).

TABLE V

(depth of deactivation in mm)

| Retardant 18% | Prior Art [HASE] < 0.5% | | | Invention [HASE] = 6% | | |
|---|---|---|---|---|---|---|
| Time | 16 H | 20 H | 24 H | 16 H | 20 H | 24 H |
| Temperature | | | | | | |
| 5° C. | 5.39 | 5.01 | 4.562 | 2.18 | 2.10 | 2.02 |
| 20° C. | 3.14 | 2.76 | 2.37 | 2.03 | 1.98 | 1.90 |
| 35° C. | 1.06 | 0.5 | 0.11 | 1.90 | 1.83 | 1.77 |
| Variation (5°–35°) | 4.33 | 4.51 | 5.45 | 0.28 | 0.27 | 0.25 |
| % of variation | 80 | 90 | 98 | 13 | 13 | 12 |

For the combination of the invention, the effect of temperature on the depth of deactivation remains much less than for the combination of the prior art (about 6 times less). As to the incidence of variation of the time of washing, this occurs for the combination of the prior art but not for the combination of the invention.

Example 5

Figure 3:
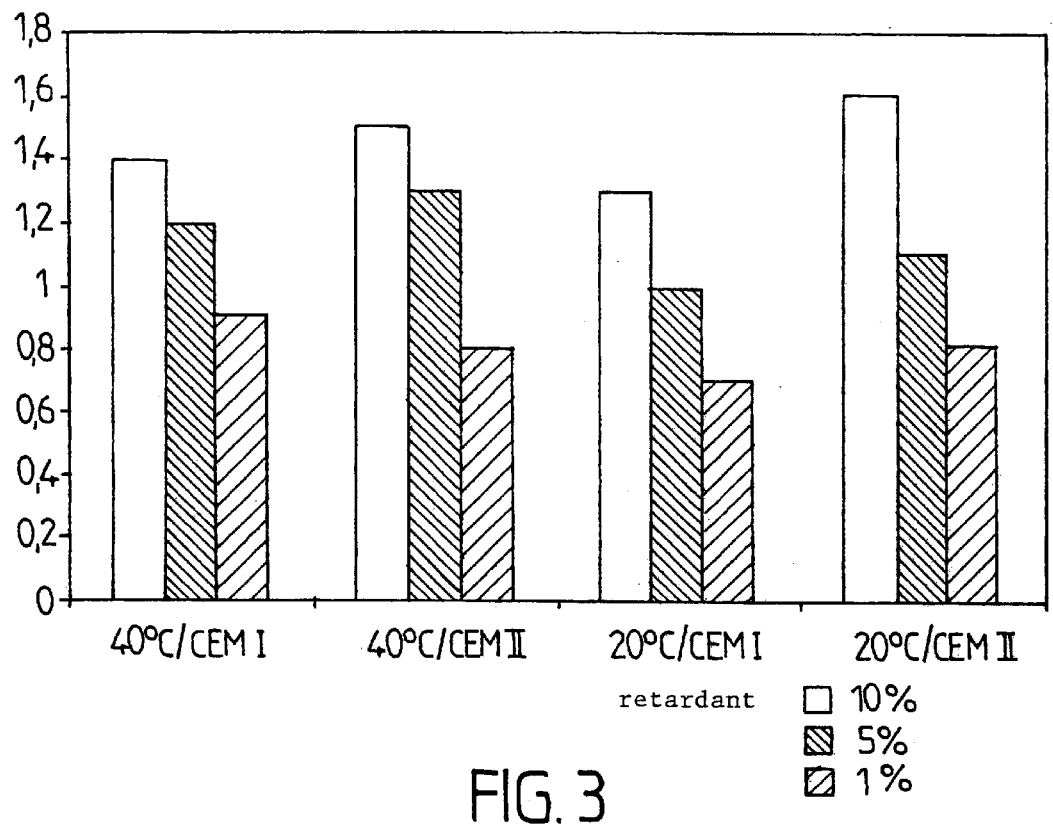
FIG. 3 shows the action of the composition according to the invention on two types of Portland cement.

The depth of deactivation has been measured by causing the nature of the cement CEM I (Portland cement containing at least 95% of clinker) to vary, and CEM II (Portland cement containing at least 65% of clinker), all else being equal, with a composition according to the invention. Three concentrations of retardant have been tested, at 20° C. and at 40° C. The results are given in FIG. 3.

It will be seen that the deactivation power is little sensitive to the nature of the cement, and that the best results (stability) are obtained at low concentrations of retardant (1%).

Example 6

Comparisons were carried out between the different carboxylic acids, namely citric acid (C), lactic acid (L), tartaric acid (T), gluconic acid (G) and acidic acid (A) under the following conditions:

On molds of about 15×15×2 CEM containing approximately 1 kg of mortar made with granulate of 0–4 mm, there was sprayed an aqueous solution according to the invention at a rate of 0.22 liter per m².

The washing was carried out the next day (for 16 hours).

Figure 4:
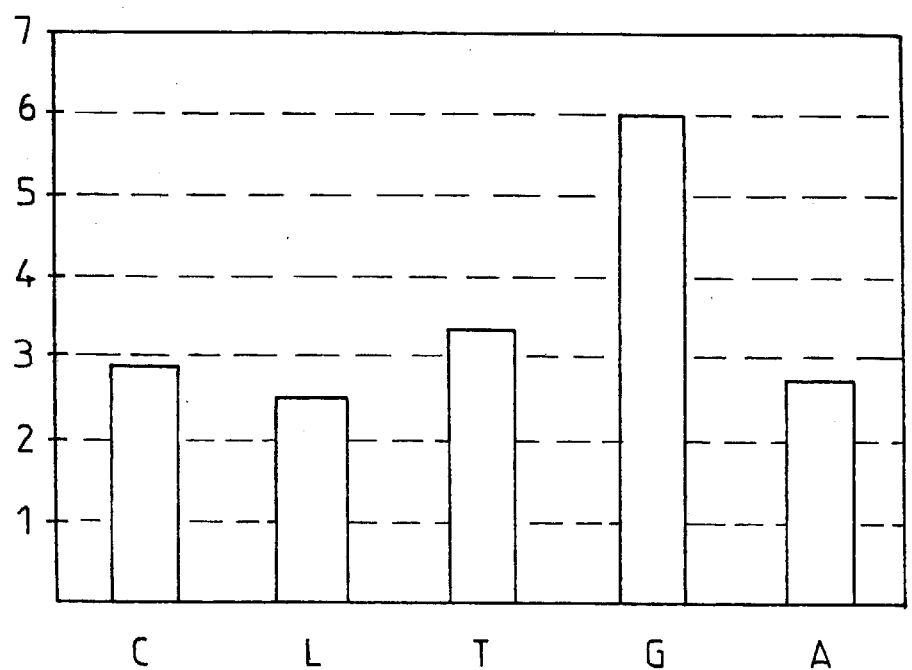
FIG. 4 gives comparisons between various carboxylic acids and the compositions according to the invention.

The mortar was weighed before and after washing, the percentages of weight of the mortar being eliminated by the deactivation are given in FIG. 4.

All the acids have an effectiveness equivalent to that of citric acid. Gluconic acid has a substantially greater effectiveness.

What is claimed is:

1. A surface deactivating composition for concrete or mortar, comprising carboxylic acid as a retardant, water and a hydrophobically modified alkaline soluble emulsion polymer as a rheology modifying agent in a concentration greater than or equal to 0.5% by weight.

2. The composition according to claim 1, wherein the concentration of the rheology modifying agent is comprised between 1 and 10% by weight.

3. The composition according to claim 1, wherein the concentration of the rheology modifying agent is between 5 and 6% by weight.

4. The composition according to claim 1, wherein the carboxylic acid has the general formula (I)

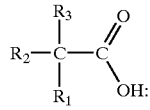

Formula (I)

$R_1$ being H or —$CH_2$—COOH $R_2$ being H or OH $R_3$ being H, $CH_3$, —(CHOH)n —$CH_2$OH, or —(CHOH)n —COOH and n being a whole number from 1 to 3.

5. The composition according to claim 1, wherein the retardant is selected from the group consisting of acetic acid, tartaric acid, citric acid, gluconic acid and lactic acid.

6. The composition according to claim 4, wherein the carboxylic acid is an α alcohol acid.

7. The composition according to claim 1, wherein the concentration of carboxylic acid is greater than about 0.5% by weight.

8. Process for modifying a surface of concrete or mortar during its setting, which comprises:
   providing a surface deactivating composition comprising carboxylic acid as a retardant, water and a hydrophobically modified alkaline soluble emulsion polymer as a rheology modifying agent in a concentration greater than or equal to 0.5% by weight;
   applying the deactivating composition to the surface in proportions of about 0.25+0.05 liter per square meter of said surface; and thereafter
   washing said surface with water.

9. The process according to claim 8, wherein the concrete or mortar comprise CEM I or CEM II cements.

10. The process according to claim 8 performed at a temperature between 5 and 40° C.

* * * * *